United States Patent
Yagi et al.

(10) Patent No.: US 8,114,795 B2
(45) Date of Patent: Feb. 14, 2012

(54) GLASS-CERAMICS AND METHOD FOR MANUFACTURING THE SAME

(75) Inventors: Toshitaka Yagi, Sagamihara (JP); Naoyuki Goto, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 245 days.

(21) Appl. No.: 12/334,794

(22) Filed: Dec. 15, 2008

(65) Prior Publication Data

US 2009/0162608 A1  Jun. 25, 2009

(30) Foreign Application Priority Data

| Dec. 21, 2007 | (JP) | 2007-330616 |
| May 23, 2008 | (JP) | 2008-136103 |
| Jul. 18, 2008 | (JP) | 2008-186878 |

(51) Int. Cl.
*C03C 10/04* (2006.01)
*C03C 10/14* (2006.01)
*G11B 7/241* (2006.01)

(52) U.S. Cl. ............. 501/5; 501/4; 428/410; 428/846.9

(58) Field of Classification Search .................. 501/4, 5, 501/7; 428/410, 846.9
See application file for complete search history.

(56) References Cited

U.S. PATENT DOCUMENTS

| 5,804,520 | A | 9/1998 | Morinaga et al. | |
|---|---|---|---|---|
| 6,034,011 | A | 3/2000 | Yamaguchi et al. | |
| 6,383,645 | B1 * | 5/2002 | Goto et al. | 428/426 |
| 6,420,288 | B2 | 7/2002 | Schweiger et al. | |
| 6,582,826 | B1 * | 6/2003 | Goto et al. | 428/426 |
| 6,645,891 | B2 | 11/2003 | Nagata et al. | |
| 6,673,729 | B2 * | 1/2004 | Siebers et al. | 501/4 |
| 6,703,332 | B2 | 3/2004 | Peng et al. | |
| 6,819,526 | B2 | 11/2004 | Kataoka et al. | |
| 7,465,686 | B2 * | 12/2008 | Comte | 501/4 |
| 7,476,633 | B2 * | 1/2009 | Comte et al. | 501/7 |
| 2001/0007723 | A1 | 7/2001 | Tokumoto | |
| 2001/0056022 | A1 | 12/2001 | Nagata et al. | |
| 2002/0031670 | A1 * | 3/2002 | Goto et al. | 428/426 |
| 2007/0004578 | A1 * | 1/2007 | Comte | 501/4 |
| 2007/0093375 | A1 * | 4/2007 | Nakajima | 501/4 |
| 2007/0129231 | A1 * | 6/2007 | Comte | 501/4 |
| 2007/0293386 | A1 * | 12/2007 | Goto | 501/4 |
| 2008/0026927 | A1 * | 1/2008 | Comte | 501/7 |

FOREIGN PATENT DOCUMENTS

| EP | 939396 | * | 9/1999 |
| JP | 10-158034 A | | 6/1998 |
| JP | 11100229 | * | 4/1999 |
| JP | 11-328601 A | | 11/1999 |
| JP | 2000143290 | * | 5/2000 |
| JP | 2001-35417 A | | 2/2001 |
| JP | 2001-076336 A | | 3/2001 |
| JP | 2001-240420 A | | 9/2001 |
| JP | 2001-287932 A | | 10/2001 |
| JP | 2001348250 | * | 12/2001 |
| WO | 00/34196 A2 | | 6/2000 |

OTHER PUBLICATIONS

Singapore Office Action dated Oct. 30, 2009, issued in corresponding Singapore Patent Application No. 200809426-0.

* cited by examiner

*Primary Examiner* — Karl Group
(74) *Attorney, Agent, or Firm* — Westerman, Hattori, Daniels & Adrian, LLP

(57) ABSTRACT

For providing glass-ceramics having properties suitable for use as a substrate of an information storage medium of next generation such as one for the perpendicular magnetic recording system without employing arsenic and antimony components which adversely affect human beings and the environment, there are provided glass-ceramics comprising $SiO_2$, $Li_2O$ and $Al_2O_3$ on oxide basis, comprising lithium disilicate as a crystal phase, and comprising one or more elements selected from the group consisting of Sn, Ce, Mn, W, Ta, Bi, Nb, S, Cl and F.

12 Claims, No Drawings

GLASS-CERAMICS AND METHOD FOR MANUFACTURING THE SAME

BACKGROUND OF THE INVENTION

This invention relates to glass-ceramics and, more particularly, to glass-ceramics for a substrate of an information storage medium. In particular, this invention provides glass-ceramics which have properties sufficient for use as a substrate of an information storage medium without using an arsenic component or an antimony component which adversely affects human beings and the environment.

This invention also offers a glass having properties sufficient for use as a substrate of an information storage medium without using an arsenic compound or an antimony component which adversely affects human beings and the environment.

In the specification of the present application, the term "information storage medium" means an information storage medium which can be used in stationary type hard disks, removable type hard disks and card type hard disks used as hard disks of a personal computer, hard disks for digital video cameras, digital cameras and audio devices, hard disks for car navigation systems, hard disks for mobile phones and hard disks for various electronic devices.

There has recently been an increased tendency to providing an information storage medium of a large capacity for coping with a multiple media tendency of a personal computer and for treating large data such as moving pictures animation and voice data in digital video cameras and digital cameras. As a result, bit density and track density of an information storage medium tend to increase and the size of bit cell tends to decrease for increasing the surface recording density of the medium. For this reason, the magnetic head is required to operate in a closer distance to the surface of a disk.

When the recording density exceeds 100 Gb/in$^2$, thermal instability occurs in such a small magnetic domain and, therefore, the surface recording system can no longer cope with requirement for a high recording density exceeding 100 Gb/in$^2$.

For coping with this problem, a perpendicular magnetic recording system has been adopted and for a large scale production of devices utilizing this system. In the perpendicular magnetic recording system, since the easy axis of magnetization runs in perpendicular direction, the bit size can be significantly reduced. Further, by having a desired film thickness of the medium (five to ten-fold of the film thickness in the surface recording system), reduction of demagnetizing field and an effect by shape magnetic anisotropy can be expected. For these reasons, the problems of decrease in the recording energy and occurrence of thermal instability in the conventional recording in the surface direction can be eliminated whereby a significantly higher recording density than in the surface recording system can be realized. Accordingly, in the perpendicular magnetic recording system, recording density of 100 Gb/in$^2$ or over on a practicable level has already been achieved on a large scale production level and studies are being made about a recording density exceeding 300 Gb/in$^2$.

This perpendicular magnetic recording system in which magnetization is performed in perpendicular direction relative to the surface of a medium is different form the conventional medium which has the easy axis of magnetization in the surface direction in that a medium having a magnetization easy axis running in perpendicular direction is used. As a recording layer of the perpendicular magnetic recording system, various alloy films including a barium-ferrite film, a Co-$\gamma$Fe$_2$O$_3$ alloy film, Co alloy films, Fe alloy films such as FePt film and Ni alloy films have been studied and put into practice.

It is however necessary in such magnetic recording medium to form the recording film at a high temperature for making crystal grains of the magnetic substance fine and causing the magnetic substance to grow in perpendicular direction. Besides, according to recent studies, it needs to be subjected to annealing at a high temperature in the order of 500° C. to 900° C. for improving its magnetic properties.

In order to cope with these requirements, there is a need for a substrate which is not likely to change its material configuration after annealing and which has sufficient heat resisting property. There is also a need for a substrate having very smooth surface flatness for enabling a low flying height of the magnetic head required by the tendency toward high recording density.

While there are requirements for a substrate having such properties and glass-ceramics which can realize such substrate, there is a need for a product which is free of an arsenic component which has been used as a refining agent of glass is likely to have an adverse effect to human beings and the environment and, for satisfying such need, an antimony component has been used as a refining agent.

It has recently been required, however, to reduce a harmful material further and there is a tendency to reducing or prohibiting use of a harmful material about which an adverse effect to human beings and the environment is considered to be relatively small. As a result, such tendency is applied also to the antimony compound which has been generally used as a material which is less harmful to human beings and the environment than the arsenic compound.

Japanese Patent Application Laid-open Publication No. 2001-76336 discloses a glass-ceramic substrate of an information storage medium comprising lithium disilicate as a predominant crystal phase and being free of arsenic and antimony compounds. Example Nos. 22 and 23 of this literature, however, have Young's modulus of 78 GPsa and 81 GPa and are insufficient in their mechanical strength which is currently sought for an information storage medium It is not known to the skilled artisan, therefore, whether or not there exist, in the glass-ceramics compositions of this literature, glass-ceramics which have properties including a sufficient refining effect and mechanical strength which are currently sought for an information storage medium. Such glass-ceramics have not actually been realized to date. Moreover, in the prior art glass-ceramics, amounts of SnO$_2$ and CeO$_2$ used as refining agents in the glass-ceramics are respectively 1 mol which exceeds 2.5% respectively when the amounts are converted to mass %. Although addition of such large amounts of SnO$_2$ and CeO$_2$ to the glass produces the refining effect in the molten glass, the specific gravity of the resulting glass-ceramics becomes large and, as a result, it becomes difficult to simultaneously satisfy both the high Young's modulus property and the low specific gravity property which are sought for an information storage medium.

Further, addition of a large amount of SnO$_2$ or CeO$_2$ gives rise to possibility of growth of a crystal phase which might hamper the properties sought for an information storage medium.

It is, therefore, an object of the present invention to provide glass-ceramics having properties suitable for use as a substrate of an information storage medium of next generation such as one for the perpendicular magnetic recording system without employing arsenic and antimony components which adversely affect human beings and the environment. Particularly it is an object of the invention to provide glass-ceramics for a substrate of an information storage medium having a coefficient of thermal expansion and chemical durability which match those of drive members, a low melting temperature and suitability for press forming which will enable high productivity.

SUMMARY OF THE INVENTION

As a result of studies and experiments made by the inventors of the present invention for achieving the above described object of the invention, the inventors have found that glass-ceramics in which an amount of a specific component used as a refining agent is limited within a specific range have a low melting temperature and a low viscosity of glass while comprising a desired crystal phase, have suitability for press forming and therefore high productivity and have a sufficient refining effect. The inventors have also found that the glass-ceramics can provide a very flat substrate surface which can cope with a low flying height of the magnetic head, have a high Young's modulus and a low specific gravity characteristic which can cope with a high speed rotation and also have excellent falling strength which exceeds 1200 G when the disk is mounted on a drive.

The present invention has the following aspects:

Aspect 1. Glass-ceramics comprising $SiO_2$, $Li_2O$ and $Al_2O_3$ on oxide basis, comprising lithium disilicate as a crystal phase, and comprising one or more elements selected from the group consisting of Sn, Ce, Mn, W, Ta, Bi, Nb, S, Cl and F.

Aspect 2. Glass-ceramics as defined in aspect 1 further comprising at least one crystal phase selected from the group consisting of lithium monosilicate, α-quartz, α-quartz solid solution and β-quartz solid solution.

Aspect 3. Glass-ceramics as defined in aspect 1 comprising at least one element of Sn and Ce and comprising in mass % on oxide basis

| | |
|---|---|
| $SnO_2$ | 0-2.5% and |
| $CeO_2$ | 0-2.5% | where a total amount of $SnO_2$ and $CeO_2$ is within a range from 0.01% to 5.0%.

Aspect 4. 4. Glass-ceramics as defined in claim 1 comprising one or more elements selected from the group consisting of S, Cl and F by using at least one of sulfate, chloride and fluoride as a raw material wherein an amount of each of the sulfate, chloride and fluoride to a total mass on oxide basis of glass materials other than the sulfate, the chloride and the fluoride is:

| | |
|---|---|
| sulfate calculated as an amount converted to $SO_3$ | 0-1.5 mass % |
| chloride calculated as an amount converted to $Cl_2$ | 0-1.5 mass % |
| fluoride calculated as an amount converted to $F_2$ | 0-1.5 mass % | where $SO_3+Cl_2+F_2$ is 0.01-1.5 mass %.

Aspect 5. Glass-ceramics as defined in aspect 1 comprising one or more elements selected from the group consisting of Mn, W, Ta, Bi and Nb, a total amount in mass % on oxide basis of one or more of $MnO_2$, $WO_3$, $Ta_2O_5$, $Bi_2O_3$ and $Nb_2O_5$ being within a range from 0.01% to 2.5%.

Aspect 6. Glass-ceramics as defined in aspect 1 comprising in mass % on oxide basis

| | |
|---|---|
| $SiO_2$ | 64-78%, |
| $Li_2O$ | 5-12% |
| $Al_2O_3$ | 4-10%, |
| $P_2O_5$ | 1.5-3.0% and |
| $ZrO_2$ | 1-10%, |

Aspect 7. Glass-ceramics as defined in aspect 1 comprising in mass % on oxide basis

| | |
|---|---|
| BaO | 0-15% and/or |
| SrO | 0-15% and/or |
| MgO | 0-2% and/or |
| CaO | 0-2% and/or |
| ZnO | 0-3% and/or |
| $K_2O$ | 0-3% and/or |
| $Na_2O$ | 0-3% and/or |
| $Cs_2O$ | 0-3% and/or | one or more oxides selected from the group consisting of $Gd_2O_3$, $La_2O_3$, $Y_2O_3$ and $Ga_2O_3$ in a total amount of 0-15% and/or $Sb_2O_3$ less than 0.1%.

Aspect 8. Glass-ceramics as defined in aspect 1 comprising a total amount in mass % on oxide basis within a range from 5% to 14% of one or more oxides selected from the group of $Li_2O$, $Na_2O$, $K_2O$ and $Cs_2O$.

Aspect 9. Glass-ceramics as defined in aspect 1 which are substantially free of $As_2O_3$ and $Sb_2O_3$.

Aspect 10. Glass-ceramics as defined in aspect 1 wherein average coefficient of linear expansion within a temperature range from 25° C. to 100° C. is within a range from $50[10^{-7\circ} C.^{-1}]$ to $120[10^{-7\circ} C.^{-1}]$.

Aspect 11. Glass-ceramics as defined in aspect 1 wherein average crystal grain diameter of the crystal phase is 100 nm or below.

Aspect 12. A substrate of an information storage medium using glass-ceramics as defined in aspect 1.

Aspect 13. A substrate of an information storage medium as defined in aspect 12 having Young's modulus of 85 GPa or over.

Aspect 14. A substrate of an information storage medium comprising a compression stress layer provided on the surface of a substrate as defined in aspect 12.

Aspect 15. A substrate of an information storage medium as defined in aspect 14 wherein the compression stress layer is formed by replacing an alkali component existing in a surface layer of the substrate with an alkali component having a larger ionic diameter than the alkali component existing in the surface layer.

Aspect 16. A substrate of an information storage medium as defined in aspect 14 wherein the compression stress layer is formed by heating the substrate and then quenching the substrate.

Aspect 17. A substrate of an information storage medium as defined in aspect 12 wherein surface roughness Ra (arithmetic mean roughness) is 2 Å or below.

Aspect 18. An information storage medium using the substrate of an information storage medium as defined in aspect 12.

Aspect 19. A method for manufacturing glass-ceramics comprising steps of melting raw materials to molten glass, forming the molten glass to glass and then heat treating the glass wherein the raw materials comprise in mass % on oxide basis:

| | |
|---|---|
| SiO$_2$ | 60-78% and |
| Li$_2$O | 5-12% and |
| Al$_2$O$_3$ | 4-10% and |
| P$_2$O$_5$ | 1.5-3.0% and |
| ZrO$_2$ | 1-10% and |
| SnO$_2$ | 0-2.5% |
| CeO$_2$ | 0-2.5% |
| MnO$_2$+ WO$_3$ + Ta$_2$O$_5$ + Bi$_2$O$_3$ + Nb$_2$O$_5$ | 0-2.5% | and further comprise, to a total mass of the raw materials, 0-2.5 mass % of sulfate calculated as being converted to SO$_3$, 0-2.5 mass % of chloride calculated as being converted to Cl$_2$, and 0-2.5 mass % of fluoride calculated as being converted to F$_2$.

Aspect 20. A method for manufacturing glass-ceramics as defined in aspect 19 wherein the raw materials comprise one or more oxides selected from the group consisting of SnO$_2$ and CeO$_2$ on oxide basis and a total amount of SnO$_2$ and CeO$_2$ in mass % on oxide basis is within a range from 0.01% to 5.0%.

Aspect 21. A method for manufacturing glass-ceramics as defined in aspect 19 wherein the raw materials further comprise one or more materials selected from the group consisting of sulfate, chloride and fluoride, and, assuming that the sulfate is converted to SO$_3$, the chloride is converted to Cl$_2$ and the fluoride is converted to F$_2$, a total amount of SO$_3$, Cl$_2$ and F$_2$ to a total mass of the raw materials other than the sulfate, chloride and fluoride is within a range from 0.01 mass % to 1.5 mass %.

Aspect 22. A method for manufacturing glass-ceramics as defined in aspect 19 wherein the raw materials comprise one or more oxides selected from the group consisting of MnO$_2$, WO$_3$, Ta$_2$O$_5$, Bi$_2$O$_3$ and Nb$_2$O$_5$ on oxide basis and a total amount of one or more oxides selected from the group consisting of MnO$_2$, WO$_3$, Ta$_2$O$_5$, Bi$_2$O$_3$ and Nb$_2$O$_5$ is within a range from 0.01 mass % to 2.5 mass %.

Aspect 23. A glass comprising SiO$_2$, Li$_2$O and Al$_2$O$_3$ and also comprising one or more elements selected from the group consisting of Sn, Ce, Mn, W, Ta, Bi, Nb, S, Cl and F.

Aspect 24. A glass as defined in aspect 23 comprising one or both of Sn and Ce wherein amounts of Sn and Ce are, in mass % on oxide basis:

| | |
|---|---|
| SnO$_2$ | 0-2.5% |
| CeO$_2$ | 0-2.5% | and a total amount of SnO$_2$ and CeO$_2$ is within a range from 0.01 mass % to 5.0 mass %.

Aspect 25. A glass as defined in aspect 23 comprising one or more elements selected from the group consisting of S, Cl and F by using sulfate, chloride and fluoride as raw materials wherein amounts of the sulfate, chloride and fluoride in the raw materials to a total mass on oxide basis of glass materials other than the sulfate, chloride and fluoride are 0-1.5 mass % of sulfate calculated as being converted to SO$_3$, 0-1.5 mass % of chloride calculated as being converted to Cl$_2$ and 0-1.5 mass % of fluoride calculated as being converted to F$_2$ where a total amount of SO$_3$, Cl$_2$ and F$_2$ is within a range from 0.01 mass % to 1.5 mass %.

Aspect 26, A glass as defined in aspect 23 comprising one or more elements selected from the group consisting of Mn, W, Ta, Bi and Nb wherein a total amount in mass % on oxide basis of one or more oxides selected from the group consisting of MnO$_2$, WO$_3$, Ta$_2$O$_5$, Bi$_2$O$_3$ and Nb$_2$O$_5$ is within a range from 0.01 mass % to 2.5 mass %.

Aspect 27. A glass as defined in aspect 23 comprising in mass % on oxide basis:

| | |
|---|---|
| SiO$_2$ | 64-78%, |
| Li$_2$O | 5-12%, |
| Al$_2$O$_3$ | 4-10%, |
| P$_2$O$_5$ | 1.5-3.0% and |
| ZrO$_2$ | 1-10%, |

Aspect 28. A glass as defined in aspect 23 comprising in mass % on oxide basis:

| | |
|---|---|
| BaO | 0-15%, |
| SrO | 0-15%, |
| MgO | 0-2%, |
| CaO | 0-2%, |
| ZnO | 0-3%, |
| K$_2$O | 0-3%, |
| Na$_2$O | 0-3%, |
| Cs$_2$O | 0-3%, and | one or more oxides selected from the group consisting of Gd$_2$O$_3$, La$_2$O$_3$, Y$_2$O$_3$ and Ga$_2$O$_3$ in a total amount of 0-15% and/or

| | |
|---|---|
| Sb$_2$O$_3$ | less than 0.1%. |

Aspect 29. A glass as defined in aspect 23 wherein a total amount in mass % on oxide basis of Li$_2$O, Na$_2$O, K$_2$O and Cs$_2$O is within a range from 5% to 14%.

Aspect 30. A glass as defined in aspect 23 which is substantially free of As$_2$O$_3$ and Sb$_2$O$_3$.

Aspect 31. A substrate of an information storage medium using a glass as defined in aspect 23.

Aspect 32. A substrate of an information storage medium using a glass obtained by heat treating a glass as defined in aspect 23 for phase separation.

Aspect 33. A substrate of an information storage medium comprising a compression stress layer provided on the surface of a substrate as defined in aspect 31.

Aspect 34. A substrate of an information storage medium as defined in aspect 33 wherein the compression stress layer is formed by replacing an alkali component existing in a surface layer of the substrate with an alkali component having a larger ionic diameter than the alkali component existing in the surface layer.

Aspect 35. A substrate of an information storage medium as defined in aspect 33 wherein the compression stress layer is formed by heating the substrate and then quenching the substrate.

Aspect 36. A substrate of an information storage medium as defined in aspect 31 wherein surface roughness Ra (arithmetic mean roughness) is 1 Å or below.

Aspect 37. An information storage medium using the substrate of an information storage medium as defined in aspect 31.

According to the invention, glass-ceramics can be provided which, notwithstanding that the glass-ceramics are substantially free of arsenic and antimony components which adversely affect human beings and the environment or an amount of these components is less than 0.1%, have properties necessary for a substrate of an information storage medium and a sufficient refining effect which is equal to the prior art glass-ceramics which comprise a large amount of arsenic or antimony component.

The glass-ceramics of the present invention and the glass of the present invention which is an intermediate before treatment for crystallization can be used for producing an information storage medium by applying mechanical processing such as lapping and polishing or applying a process for forming stress on the surface layer of a substrate.

The glass of the present invention has somewhat smaller mechanical strength but has a flatter surface as to the surface roughness obtained after lapping and polishing than the glass-ceramics of the present invention.

DESCRIPTION OF PREFERRED EMBODIMENTS

Embodiments of the present invention will now be described.

Glass-ceramics of the present invention comprise, as its predominant crystal phase, a lithium disilicate crystal phase. By comprising this crystal phase, the glass-ceramics have excellent heat resistance, mechanical strength and strength for coping with a high speed rotation and a falling impact and can realize a thermal expansion property and chemical durability matching these properties of drive units.

The glass-ceramics may also comprise at least one crystal phase selected from the group consisting of lithium monosilicate, α-quartz, α-quartz solid solution and β-quartz solid solution. These crystal phases sometimes precipitate as by-products when the lithium disilicate crystal phase precipitates but they do not adversely affect properties required for a substrate of an information storage medium. Crystal phases other than those crystal phases have possibility of adversely affecting the properties required for a substrate of an information storage medium and, therefore, it is not desirable for the glass-ceramics to comprise such crystal phases.

The term "solid solution" herein means α-quartz crystal or β-quartz crystal in which a part of the crystal is replaced by an element other than an element which constitutes the crystal or in which an atom exists between crystals. Particularly, β-quartz solid solution is a comprehensive name expressed by a chemical formula of $Li_xAl_xSi_{1-x}O_2$ (0<X<1) and may include further other elements which replace the elements constituting the substance or enter the substance.

Description will now be made about components which construct the glass-ceramics of the present invention. Amounts of the respective components are expressed in mass % on oxide basis. The term "oxide basis" herein means a manner for expressing composition of respective components contained in the glass-ceramics, assuming that oxides, nitrates etc. which are used as raw materials of the glass-ceramics of the invention are all decomposed and converted to oxides during melting, Assuming that a total sum of mass of the oxides thus produced is 100 mass %, an amount of each component contained in the glass-ceramics is expressed in mass %.

For manufacturing the glass-ceramics of the present invention, raw materials of specific composition are melted in a platinum crucible or a quartz crucible and then annealed to form mother glass. This mother glass is heat treated for crystallization to obtain glass-ceramics. If amounts of the raw materials are expressed on oxide basis, these amounts in principle are the same as the amounts of the components which constitute the glass-ceramics. There is a case, however, where amounts of some raw materials differ from amounts of the components of the glass-ceramics due, for example, to evaporation during melting. In the following description, such difference will be mentioned only where there is difference between an amount of a raw material and an amount of a component of the glass-ceramics.

In the glass-ceramic of the present invention, by comprising a specific content range of one or more elements selected from the group consisting of Sn, Ce, Mn, W, Ta, Bi, Nb, S, Cl and F, a high refining effect equal to that obtained by $As_2O_3$ or $Sb_2O_3$ can be obtained while maintaining properties required for a substrate of an information storage medium. In the present invention, one or more of these elements function as a refining agent.

For obtaining a high refining effect while maintaining properties required for a substrate of an information storage medium, one or both of Sn and Ce should preferably be added. A refining effect can be obtained even when Sn and/or Ce only is used but it may also be used together with other refining agent or agents. For obtaining a high refining effect, the lower limit of a total amount of $SnO_2$ and/or $CeO_2$ should preferably be 0.01% on oxide basis, more preferably be 0.05% and most preferably be 0.1%. In a case where the glass-ceramics comprise a refining agent other than Sn and Ce, the total amount of $SnO_2$ and/or $CeO_2$ may be 0%. For obtaining the same effect, the lower limit of an amount of each of $SnO_2$ and $CeO_2$ should preferably be 0.05% and more preferably be 0.1%. In a case where a refining agent other than Sn and Ce is added, the amount of each of $SnO_2$ and $CeO_2$ may be 0%.

For achieving a low specific gravity and causing a desired crystal phase to precipitate and obtaining a high refining effect while maintaining sufficient mechanical strength, the upper limit of a total amount of $SnO_2$ and $CeO_2$ should preferably be 5.0%, more preferably be 4.0% and most preferably be 3.0%. For obtaining the same effect, the upper limit of an amount of each of $SnO_2$ and $CeO_2$ should preferably be 2.5%, more preferably be 2.0% and most preferably be 1.5%.

For obtaining a higher refining effect while maintaining the above described properties, both $SnO_2$ and $CeO_2$ should preferably be added together.

In the composition of the glass-ceramics of the present invention, in a case where a substrate of an information storage medium is produced by using the direct press method (i.e., method of pressing molten glass with upper and lower molds directly), impact of pressing tends to cause reboiling, i.e., the phenomenon of regeneration of bubbles after refined glass with the resulting difficulty in achieving a high refining effect. Therefore, in a case where the glass-ceramics of the present invention are used for direct pressing, it is preferable to use either one of $SnO_2$ and $CeO_2$ only.

One or more elements selected from the group consisting of S, Cl and F also have a refining effect while maintaining properties required for a substrate of an information storage medium. Therefore, the glass-ceramics may comprise one or more such elements as a single refining agent or together with other refining agent. These elements may be added by adding sulfate, chloride and fluoride as raw materials. Since these raw materials partially evaporate during the melting process, amounts of these raw materials differ from amounts of the glass-ceramic components derived from these raw materials. The fluoride may be added as, e.g., $MgF_2$ and $CaF_2$, the sulfate may be added as, e.g., $MgSO_4$ and $BaSO_4$ and the chloride may be added as, e.g., $BaCl_2$ and $SnCl_2$.

For achieving a refining effect by components, the lower limit of a total mass ratio of one or more of the fluoride component, sulfate component and chloride component converted respectively to $F_2$, $SO_3$ and $Cl_2$ to a total mass of other raw materials expressed on oxide basis should preferably be 0.01 mass %, more preferably 0.03 mass % and, most preferably 0.05 mass %. In a case, however, where a refining agent other than sulfate, chloride and fluoride is added, the total mass ratio of these materials may be 0%.

For obtaining the same effect, the lower limit of each of an amount of the fluoride converted to $F_2$, an amount of the sulfate converted to $SO_3$ and an amount of the chloride concerted to $Cl_2$ to a total mass of other raw materials expressed on oxide basis should preferably be 0.01 mass % and more preferably be 0.02 mass %. In a case where the glass-ceramics comprise other refining agent than S, Cl and F, the total mass ratio of these elements may be 0%.

For obtaining a refining effect while causing a desired crystal phase to precipitate and maintaining properties required for a substrate of an information storage medium, the upper limit of a total mass ratio of one or more of the fluoride component, sulfate component and chloride component converted respectively to $F_2$, $SO_3$ and $Cl_2$ to a total mass of other raw materials expressed on oxide basis should preferably be 1.5 mass %, more preferably be 1.2 mass % and most preferably be 1.0 mass %.

For preventing reboiling while obtaining the same effect, the upper limit of each of an amount of the fluoride converted to $F_2$, an amount of the sulfate converted to $SO_3$ and an amount of the chloride converted to $Cl_2$ to a total mass of other raw materials expressed on oxide basis should preferably be 1.5 mass %, more preferably be 1.0 mass % and, for preventing reboiling occurring during direct pressing, the glass-ceramics should most preferably be substantially free of these components. The term "substantially free" herein means that these components are not added intentionally, allowing mixing of a trace of these materials as impurities.

The glass-ceramics may comprise one or more elements selected from the group consisting of Mn, W, Ta, Bi and Nb can, by themselves or together with other refining agent, perform a refining effect while maintaining properties required for a substrate of an information storage medium. For obtaining the refining effect, the lower limit of a total amount on oxide basis of one or more components of $MnO_2$, $WO_3$, $Ta_3O_5$, $Bi_2O_3$ and $Nb_2O_5$ should preferably be 0.01%, more preferably be 0.05% and most preferably be 0.1%. In a case where a refining agent other than Mn, W, Ta, Bi and Nb is added, the total amount of these oxides may be 0%.

For obtaining a refining effect while causing a desired crystal phase to precipitate and maintaining properties required for a substrate of an information storage medium, the upper limit of a total amount of these components should preferably be 2.5%, more preferably be 2% and, from the standpoint of preventing reboiling during direct pressing, the glass-ceramics should be substantially free of these components.

$As_2O_3$ and $Sb_2O_3$ function as a refining agent but they are components which adversely affect the environment so that use of these components should be held at the minimum. Since the glass-ceramics of the present invention can achieve the refining effect without use of $As_2O_3$ or $Sb_2O_3$, for reducing adverse effect to the environment, an amount of $As_2O_3$ or $Sb_2O_3$ should preferably be less than 0.1% and, more preferably the glass-ceramics should be substantially free of these components.

$SiO_2$ is an essential component for precipitation of the above described crystal phase as a predominant crystal phase by heat treating mother glass. If the amount of this component is less than 60%, the precipitating crystal phase of the glass-ceramics obtained is instable and its texture tends to become gross with the result that the mechanical strength is deteriorated and surface roughness after polishing becomes large. Therefore, the lower limit of this component should preferably be 60%, more preferably be 62% and most preferably, be 64%. If the amount of this component exceeds 78%, difficulty arises in melting and forming of the glass and, as a result, homogeneity of the glass is reduced. Therefore, the upper limit of this component should preferably be 78%, more preferably be 77% and most preferably be 76%.

$Li_2O$ is an important component which is essential for precipitation of the above described crystal phase and which also contributes to low viscosity of the glass. If the amount of this amount is less than 5%, these effects cannot be sufficiently obtained and, therefore, the amount of this component should preferably be 5%, more preferably be 5.5% and most preferably be 6%. If the amount of this component exceeds 12%, chemical durability deteriorates significantly and, therefore, the upper limit of this component should preferably be 12%, more preferably be 11% and most preferably be 10.5%.

$K_2O$ may be optionally added, for this component is effective for making crystal grains fine and reducing viscosity of the glass. If the amount of this component exceeds 3%, difficulty arises in vitrification of raw materials with resulting difficulty in realizing a desired crystal phase. The upper limit of this component therefore should preferably be 3%, more preferably be 2.5% and most preferably, be 2%.

$Na_2O$ may be optionally added, for this component is effective for reducing viscosity of the glass. If the amount of this component exceeds 3%, difficulty arises in vitrification of raw materials with resulting difficulty in realizing a desired crystal phase. The upper limit of this component therefore should preferably be 3%, more preferably be 2.5% and most preferably be 2%.

$Cs_2O$ may be optionally added, for this component is effective for reducing viscosity of the glass. If the amount of this component exceeds 3%, difficulty arises in vitrification of raw materials with resulting difficulty in realizing a desired crystal phase. The upper limit of this component therefore should preferably be 3%, more preferably be 2.5% and most preferably be, 2%.

For a use as a substrate of an information storage medium, an amount of solving out of an alkali component should preferably be reduced to the maximum extent possible. For holding the amount of solving out of an alkali component down to an amount at which the glass-ceramics can be used as a substrate of an information storage medium for a next generation which typically is a substrate of an information storage medium of the perpendicular magnetic recording system, a total amount of $Li_2O$ which is added as an essential component and one or more components of $Na_2O$, $K_2O$ and $Cs_2O$ which are added as optional components should preferably be 14% or below, more preferably be 13% or below and most preferably be 12% or below. For facilitating reduction in viscosity of the glass, a total amount of $Li_2O$ and one or more of $Na_2O$, $K_2O$ and $Cs_2O$ which are added as optional components should preferably be 5% or over, more preferably be 6% or over and most preferably be 7% or over.

$Al_2O_3$ is an important component which precipitates, like $SiO_2$, the above described crystal phase and also contributes to improvement of stability and chemical durability of the glass. If the amount of this component is less than 4%, difficulty arises in vitrification of the glass and, therefore, the lower limit of this component should preferably be 4%, more preferably be 4.5% and most preferably be 5%. If the amount of this component exceeds 10%, melting property, formability and resistance to devitrification are deteriorated and, as a result, homogeneity is reduced and, therefore, the upper limit of this amount should preferably be 10%, more preferably be 9.5% and most preferably be 9%.

$P_2O_5$ may be added as a nucleating agent. It also contributes to reducing viscosity and, when it coexists with $SiO_2$, it improves melting and refining properties of the mother glass. For achieving these effects accurately and sufficiently, the lower limit of the amount of this component should preferably be 1.5%, more preferably be 1.6% and, most preferably be 1.7%. If the amount of this component exceeds 3%, difficulty arises in vitrification and devitrification tends to occur. Therefore, the upper limit of this component should preferably be 3%, more preferably be 2.9% and most preferably be 2.8%.

$ZrO_2$ may be added as a nucleating agent. This component also contributes to improvement of chemical durability and physical properties and is effective for obtaining fine crystals. For obtaining these effects easily, it is preferable to add this component in an amount of 1% or over, more preferably 1.2% or over and most preferably 1.4% or over. If, however, the amount of this component exceeds 10%, a portion left unmelted and $ZrSiO_4$ (zircon) are produced. The upper limit of this component, therefore, should preferably be 10%, more preferably be 8% and most preferably be 6%.

BaO may be added optionally since this component can realize low viscosity of the glass while maintaining a desired crystal phase. For realizing low viscosity of molten glass and precipitation of a desired crystal, and making precipitating crystals fine, this component should preferably be added in an amount of 2.5% or over and most preferably in an amount of 3.5% or over. For adjusting the specific gravity to a proper value, the upper limit of this component should preferably be 15% and more preferably be 14% and most preferably be 13%.

SrO may be added optionally since this component, like BaO, can realize low viscosity of the glass while maintaining a desired crystal phase. For realizing low viscosity of molten glass and precipitation of a desired crystal, and making precipitating crystals fine, this component should preferably be added in an amount of 2.5% or over and most preferably in an amount of 3.5% or over. For adjusting the specific gravity to a proper value, the upper limit of this component should preferably be 15% and more preferably be 14% and most preferably be 13%.

In a case where an amount of alkali component which deteriorates chemical durability should be reduced, BaO and SrO may be added for replacing the alkali component. These components are very effective for realizing low viscosity of molten glass for satisfying the press forming capacity required by the industry. For satisfying this effect sufficiently, a total amount of one or both of SrO and BaO should preferably exceed 3.5%, more preferably be 3.6% and most preferably be 3.7%.

Even if SrO and BaO are added in a large amount, enlargement of crystal grain and generation of a solid solution of these components with a crystal phase hardly take place but, on the other hand, it will increase specific gravity. For maintaining specific gravity at a proper value and obtaining the above described effect, a total amount of one or both of SrO and BaO should preferably be 15% or below, more preferably be 14% or below and most preferably be 13% or below.

MgO, CaO and ZnO may be optionally added, for these components are effective for reducing viscosity and making the precipitating glass fine. If, however, an amount of MgO exceeds 2%, an amount of CaO exceeds 2% and an amount of ZnO exceeds 3%, the precipitating crystal tends to become instable and its texture tends to become gross with resulting difficulty in obtaining a desired crystal phase. Moreover, devitrification tendency occurs in the mother glass. Therefore, the upper limit of the amount of each of these components should preferably be 2% for MgO and CaO and 3% for ZnO, more preferably be 1.6% for MgO and CaO and 2.4% for ZnO, and most preferably be 1.2% or MgO and CaO and 1.8% for ZnO.

Since $Gd_2O_3$, $La_2O_3$, $Y_2O_3$ and $Ga_2O_3$ are effective for reducing viscosity, improving mechanical property by improving Young's modulus, and raising temperature at which heat treatment for crystallization is performed, i.e., improving heat resisting property, these components may be optionally added. It will suffice however to add a total amount up to 15% of one or more of these components and, if the total amount of these components exceeds 15%, difficulty arises in vitrification and crystallization. The upper limit of the total amount of these components therefore should preferably be 15%, more preferably be 10% and most preferably be 8%.

Since $B_2O_3$ contributes to reducing viscosity of the glass and improving melting and forming properties of the glass, this component may be optionally added within a range not impairing properties of the glass-ceramics. If the amount of this component exceeds 5%, phase separation tends to take place with resulting difficulty in obtaining a desired crystal phase. The upper limit of the amount of this component therefore should preferably be 5%, more preferably be 4% and most preferably be 3%.

$TiO_2$ may be optionally added as a nucleating agent. If the amount of this component exceeds 5%, difficulty arises in obtaining a desired crystal phase and a $TiO_2$ phase sometimes precipitates as a crystal phase after the crystallizing process. Therefore, the upper limit of the amount of this component should preferably be 5%, more preferably be 4% and most preferably be 3%.

Description will now be made about average crystal grain diameter of a crystal phase of the glass-ceramics according to the present invention. The average crystal grain diameter influences surface characters of a substrate after processing the substrate and polishing the surface of the substrate. As described previously, as the surface recording density of an information storage medium increases, the flying height of a magnetic head is currently 15 nm or below and the progress is still being made for a flying height of 10 nm or below and further to the near contact recording system or even to the contact recording system according to which the magnetic head contacts the recording surface completely. For coping with such tendency, flatness of the surface of a substrate must be superior to that of conventional substrates.

If one attempts to perform high density input and output of information to and from a magnetic storage medium at the conventional flatness level, such high density input and output cannot be made because distance between the magnetic head and the medium has to be large. If an attempt is made to reduce this distance, the magnetic head collides with projections of the medium (disk substrate) with the result that the magnetic head or medium will be damaged. For avoiding such collision and damage of the magnetic head or medium and also avoiding absorption between the magnetic head and the medium even at such a low flying height or contact state, the upper limit of surface roughness Ra (arithmetic mean roughness) is 2 Å.

For obtaining such flat polished surface easily, the upper limit of an average crystal grain diameter of crystal grains of the glass-ceramics should preferably be 100 nm, more preferably be 70 nm and most preferably be 50 nm. For achieving excellent mechanical strength and heat resisting property, the lower limit of the average crystal grain diameter of the crystal grains of the glass-ceramics should preferably be 1 nm.

In a case where the glass before crystallization of the present invention is used for a substrate of an information storage medium, surface roughness Ra after polishing of 1 Å or below can be realized and, more preferably, Ra after polishing of 0.5 Å or below can be realized.

In the glass-ceramics of the present invention, mechanical strength can be improved by causing fine crystal grains to precipitate uniformly. Since the precipitating crystal grains prevent growth of a fine crack, defect such as chipping during lapping and polishing can be significantly reduced.

Mechanical strength, particularly ring flexural strength, of the glass-ceramics can be remarkably improved by causing such fine crystal grains to precipitate and forming a compression stress layer on the surface of the substrate. From such standpoint, the average crystal grain diameter of the crystal grains should preferably be within the above described range.

By these arrangements, in a case, for example, where the glass-ceramics of the present invention are used for a substrate such as a substrate of an information storage disk, the surface recording density can be increased and, even if the substrate is rotated at a high speed for improving the recording density, deflection and deformation of the substrate can be prevented and vibration due to the high speed rotation can be reduced whereby the number of errors (TMR) in data reading caused by vibration and deflection can be reduced. Moreover, since this substrate has excellent impact resistance, a head crash or a damage to the substrate will hardly take place when the substrate is used as an information storage medium for a mobile use and, as a result, it will exhibit an excellent stable operation.

The term "average crystal grain diameter" of the crystal grains means median accumulated value of grain diameter ("median diameter" d50) on area basis of a crystal image (n=100) measured by a transmission electron microscope (TEM). The grain diameter is a value at which, when a crystal image obtained is held with two straight lines, distance between the two straight lines becomes maximum. The term "ring flexural strength" means flexural strength measured by the concentric bending method according to which a thin disk sample having diameter of 65 mm and thickness of 0.635 mm is prepared and strength of the disk sample is measured by using a circular support ring and a loading ring.

Description will now be made about Young's modulus and specific gravity. As described previously, there is the tendency toward high speed rotation of an information storage disk for increasing recording density and data transfer speed. For coping with this tendency, the material of the substrate must have high rigidity and low specific gravity for preventing vibration of the disk due to deflection during the high speed rotation. In a case where the substrate is used for a mobile type recording device such as a head contacting type recording device and a removable recording device, the substrate should preferably have sufficient mechanical strength, high Young's modulus and large surface hardness for sufficiently standing use in such devices. More specifically, the substrate should preferably have Young's modulus of 85 GPa or over, more preferably 88 GPa or over and most preferably 90 GPa or over.

If the substrate has high rigidity but its specific gravity is excessively large, deflection occurs during high speed rotation due to its large weight resulting in occurrence of vibration. On the other hand, if the substrate has low specific gravity but its rigidity is low, vibration likewise occurs. Moreover, if specific gravity is too low, it becomes difficult to achieve desired mechanical strength. Therefore, there must be balance between apparently conflicting properties of high rigidity and low specific gravity. The ratio of Young's modulus [GPa]/specific gravity should preferably be 32 or over, more preferably be 33 or over and most preferably be 34 or over. As to specific gravity, it needs to be 2.7 or below even if the substrate has high rigidity but if specific gravity is below 2.2, it becomes substantially difficult to obtain a substrate having desired rigidity.

As to average coefficient of linear expansion, for achieving good matching between the average coefficient of linear expansion of the substrate with that of respective component parts of a hard disk, the lower limit of average coefficient of linear expansion within a temperature from 25° C. to 100° C. should preferably be $50[10^{-7\circ} C.^{-1}]$, more preferably be $52[10^{-7\circ} C.^{-1}]$ and most preferably be $55[10^{-7\circ} C.^{-1}]$. For the same reason, the upper limit of average coefficient of linear expansion should preferably be $120[10^{-7\circ} C.^{-1}]$, more preferably be $110[10^{-7\circ} C.^{-1}]$ and most preferably be $100[10^{-7\circ} C.^{-1}]$.

Since the glass-ceramics of the present invention have the above described average coefficient of linear expansion, the glass-ceramics can be used advantageously for uses of various precision parts for which thermal stability in size is required.

By providing a compression stress layer on the surface of the glass-ceramics, the glass-ceramics of the present invention can achieve the effect of improving mechanical strength compared with the glass-ceramics before the compression stress layer is provided.

For forming the compression stress layer, there is a chemical reinforcing method according to which a compression stress layer is formed by replacing an alkali component existing in a surface layer of the glass-ceramics before the compression stress layer is formed with an alkali component having a larger ionic diameter than the alkali component existing in the surface layer. There is also a thermal reinforcing method according to which a compression stress layer is formed by heating the glass-ceramics and then quenching the glass-ceramics. There is also an ion filling method according to which a compression layer is formed by filling ion into a surface layer of the glass-ceramics.

In the chemical reinforcing method, glass-ceramics are immersed in a solution of a salt containing potassium or sodium, e.g., potassium nitrate ($KNO_3$) or sodium nitrate ($NaNO_3$) or a complex salt thereof at a temperature within a range from 300° C. To 600° C. for 0.5 to 12 hours. By this process, a lithium component ($Li^+$ ion) existing in a remaining glass component of the glass-ceramics is replaced by a sodium component ($Na^+$ ion) or potassium component ($K^+$ ion) which is an alkali component having a larger ionic diameter than Li, or a sodium component ($Na^+$ ion) existing in a remaining glass component of the glass-ceramics is replaced by a potassium component ($K^+$ ion) which is an alkali component having a larger ionic diameter than Na. Such replacement reaction increases volume of the glass-ceramics and compression stress thereby is generated in the surface layer of the glass-ceramics and, as a result, ring flexural strength which is an index of impact resistance is increased.

There is no particular limitation in the thermal reinforcing method. For example, by heating the glass-ceramics to a temperature within a range from 300° C. to 600° C. and then applying quenching by water cooling and/or air cooling, a compression stress layer can be formed by difference in temperature between the surface and inside portion of the glass-ceramics. A compression stress layer may also be effectively formed by combining the chemical reinforcing method with the thermal reinforcing method.

The above described methods of forming a compression stress layer can be applied also to a case where glass before crystallization is used as a substrate of an information storage medium.

For manufacturing the glass-ceramics of the present invention, glass materials comprising raw materials of the above described components are melted and annealed to produce mother glass. The mother glass is heat treated at a temperature within a range from 500° C. to 650° C. for nucleation and, after the nucleating process, is heat treated at a temperature within a range from 600° C. to 850° C. for crystallization.

In a case where the glass before it is treated for producing glass-ceramics is used as a substrate of an information storage medium, the glass may be heat treated for phase separation for removing strain of the material and improvement of mechanical strength. For producing phase separation in the glass, the glass may preferably be heat treated at a temperature within a range from 550° C. to 600° C. for 3 to 12 hours.

For manufacturing a substrate of an information storage medium, molten glass produced in the above described manner is dripped on a lower mold and is pressed by upper and lower molds of a press to form the glass to a disk and the disk is processed if necessary and then lapped and polished in a known manner.

EXAMPLES

Preferred examples of the present invention will now be described. The present invention in no way will be limited to these examples.

Tables 1 to 7 show glass composition, number of remaining bubbles per 1 cm$^2$ of amorphous glass after melting, specific gravity, Young's modulus, Young's modulus/specific gravity, average coefficient of linear expansion ($\alpha$) at 25° C.-100° C., the highest temperature of heat treatment for crystallization, average crystal grain diameter and predominant crystal phase of Examples 1-34. The composition of each example is expressed in mass %. In a case where sulfate, chloride and/or fluoride are added to the glass raw materials, an amount of the fluoride converted to $F_2$, an amount of the sulfate converted to $SO_3$, and an amount of the chloride converted to $Cl_2$ respectively to a total mass of the raw materials other than these components expressed on oxide basis are expressed in mass %.

Average coefficient of linear expansion is a value measured in accordance with JOGIS (Japan Optical Glass Industry Standard) 16-2003 (Measuring Method of Average Coefficient of Linear Expansion in the Vicinity of Room Temperature of Optical Glass) and by changing the temperature range from 25° C. to 100° C.

Specific gravity was measured by the Archimedes method and Young's modulus was measured by the supersonic wave method.

The crystal phase was identified from an X-ray diffraction image obtained by X-ray diffraction device (made by Panalytical Co. Product name: X'pert-MPD).

In the tables, "bubbles per 1 cm$^3$" designates number of remaining bubbles per 1 cm$^3$, "gl.ce.", glass-ceramics, "s.gravity" specific gravity, "Y.m." Young' modulus, "hi.temp." the highest temperature of treatment for crystallization, "grain diameter" average crystal grain diameter, "li.di." lithium disilicate, "α-q." α-quartz, and "β-q.s.s." β-quartz solid solution.

TABLE 1

| | | Examples | | | | |
|---|---|---|---|---|---|---|
| | | 1 | 2 | 3 | 4 | 5 |
| composition | SiO$_2$ | 75.1 | 74.5 | 74.0 | 70.3 | 69.7 |
| | Al$_2$O$_3$ | 7.0 | 7.0 | 7.0 | 6.5 | 6.5 |
| | P$_2$O$_5$ | 2.0 | 2.0 | 2.0 | 2.0 | 2.0 |
| | Li$_2$O | 9.9 | 9.9 | 9.9 | 8.5 | 8.5 |
| | K$_2$O | 2.0 | 2.0 | 2.0 | 1.5 | 1.5 |
| | MgO | 0.8 | 0.8 | 0.0 | 0.8 | 0.8 |
| | CaO | 0.0 | 0.0 | 0.8 | 0.0 | 0.0 |
| | BaO | 0.0 | 0.0 | 0.0 | 5.5 | 5.5 |
| | ZnO | 0.5 | 0.5 | 0.5 | 0.5 | 0.5 |
| | ZrO$_2$ | 2.3 | 2.3 | 2.3 | 4.0 | 4.0 |
| | CeO$_2$ | 0.2 | 0.5 | 0.5 | 0.2 | 0.5 |
| | SnO$_2$ | 0.2 | 0.5 | 1.0 | 0.2 | 0.5 |
| | total | 100.0 | 100.0 | 100.0 | 100.0 | 100.0 |
| bubbles per/1 cm$^3$ | | 8 | 9 | 8 | 6 | 10 |
| gl. ce. | s. gravity | 2.46 | 2.48 | 2.46 | 2.57 | 2.59 |
| | Y.m. (Gpa) | 100 | 100 | 98 | 96 | 96 |
| | Y.m./s.g. | 40.7 | 40.3 | 39.8 | 37.4 | 37.1 |
| | α (25-100° C.) (10$^{-7}$° C.$^{-1}$) | 78 | 77 | 70 | 65 | 62 |
| predominant crystal phase | | li. di.α-q. | li. di.α-q. | li. di.α-q. | li. di.α-q. β-q.s.s. | li. di.α-q. β-q.s.s. |
| hi. temp. (° C.) | | 720 | 720 | 700 | 700 | 700 |
| grain diameter(nm) | | 50 | 50 | 30 | 30 | 30 |

TABLE 2

| | | Examples | | | | |
|---|---|---|---|---|---|---|
| | | 6 | 7 | 8 | 9 | 10 |
| composition | SiO$_2$ | 69.2 | 66.3 | 65.7 | 65.2 | 66.3 |
| | Al$_2$O$_3$ | 6.5 | 6.5 | 6.5 | 6.5 | 6.5 |

TABLE 2-continued

|  |  | Examples |  |  |  |  |
|---|---|---|---|---|---|---|
|  |  | 6 | 7 | 8 | 9 | 10 |
|  | $P_2O_5$ | 2.0 | 2.5 | 2.5 | 2.5 | 2.5 |
|  | $Li_2O$ | 8.5 | 7.5 | 7.5 | 7.5 | 7.5 |
|  | $K_2O$ | 1.5 | 1.5 | 1.5 | 1.5 | 1.5 |
|  | MgO | 0.8 | 0.8 | 0.8 | 0.8 | 0.8 |
|  | CaO | 0.0 | 0.0 | 0.0 | 0.0 | 0.0 |
|  | BaO | 5.5 | 10.0 | 10.0 | 10.0 | 10.5 |
|  | ZnO | 0.5 | 0.5 | 0.5 | 0.5 | 0.0 |
|  | $ZrO_2$ | 4.0 | 4.0 | 4.0 | 4.0 | 4.0 |
|  | $CeO_2$ | 0.5 | 0.2 | 0.5 | 0.5 | 0.2 |
|  | $SnO_2$ | 1.0 | 0.2 | 0.5 | 1.0 | 0.2 |
|  | total | 100.0 | 100.0 | 100.0 | 100.0 | 100.0 |
| bubbles per 1 $cm^3$ |  | 15 | 1 | 5 | 16 | 7 |
| gl. ce. | s. gravity | 2.60 | 2.65 | 2.66 | 2.67 | 2.65 |
|  | Y.m. (GPa) | 98 | 96 | 98 | 96 | 96 |
|  | Y.m./s.g. | 37.7 | 36.2 | 36.8 | 36.0 | 36.2 |
|  | α (25-100° C.) ($10^{-7}$ °$C.^{-1}$) | 64 | 62 | 62 | 61 | 64 |
| predominant crystal phase |  | li. di.α-q. β-q.s.s. | li. di.α-q. β-q.s.s. | li. di.α-q. β-q.s.s. | li. di.α-q. β-q.s.s. | li. di.α-q. β-q.s.s. |
| hi. temp. (° C.) |  | 695 | 690 | 685 | 690 | 690 |
| grain diameter(nm) |  | 30 | 30 | 30 | 30 | 30 |

TABLE 3

|  |  | Examples |  |  |  |  |
|---|---|---|---|---|---|---|
|  |  | 11 | 12 | 13 | 14 | 15 |
| composition | $SiO_2$ | 75.5 | 75.5 | 70.7 | 70.7 | 66.5 |
|  | $Al_2O_3$ | 7.0 | 7.0 | 6.5 | 6.5 | 6.5 |
|  | $P_2O_5$ | 2.0 | 2.0 | 2.0 | 2.0 | 2.5 |
|  | $Li_2O$ | 9.9 | 9.9 | 8.5 | 8.5 | 7.5 |
|  | $K_2O$ | 2.0 | 2.0 | 1.5 | 1.5 | 1.5 |
|  | MgO | 0.8 | 0.8 | 0.8 | 0.8 | 0.8 |
|  | CaO | 0.0 | 0.0 | 0.0 | 0.0 | 0 |
|  | BaO | 0.0 | 0.0 | 5.5 | 5.5 | 10.0 |
|  | ZnO | 0.5 | 0.5 | 0.5 | 0.5 | 0.5 |
|  | $ZrO_2$ | 2.3 | 2.3 | 4.0 | 4.0 | 4.0 |
|  | $CeO_2$ | 0.5 | 0.2 | 0.5 | 0.5 | 0.2 |
|  | $SnO_2$ | 1.0 | 0.2 | 0.5 | 1.0 | 0.2 |
|  | total | 100.0 | 100.0 | 100.0 | 100.0 | 100.0 |
|  | sulfate (converted to $SO_3$) | 0.17 | 0.08 | 0.08 | 0.0 | 0.51 |
|  | chloride (converted to $Cl_2$) | 0.37 | 0.19 | 0.0 | 0.37 | 0.0 |
|  | fluoride (converted to $F_2$) | 0.0 | 0.0 | 0.0 | 0.0 | 0.30 |
| bubbles per 1 $cm^3$ |  | 6 | 9 | 11 | 2 | 5 |
| gl. ce. | s. gravity | 2.46 | 2.46 | 2.57 | 2.57 | 2.65 |
|  | Y.m. (GPa) | 100 | 100 | 100 | 100 | 96 |
|  | Y.m./s.g. | 40.7 | 40.7 | 38.9 | 38.9 | 36.2 |
|  | α (25-100° C.) ($10^{-7}$ °$C.^{-1}$) | 76 | 75 | 64 | 64 | 62 |
| predominant crystal phase |  | li. di.α-q. | li. di.α-q. | li. di.α-q. β-q.s.s. | li. di.α-q. β-q.s.s. | li. di.α-q. β-q.s.s. |
| hi. temp. (° C.) |  | 720 | 720 | 700 | 700 | 690 |
| grain diameter(nm) |  | 50 | 30 | 30 | 30 | 30 |

TABLE 4

|  |  | Examples |  |  |  |  |
|---|---|---|---|---|---|---|
|  |  | 16 | 17 | 18 | 19 | 20 |
| composition | $SiO_2$ | 74.5 | 74.8 | 75.3 | 70.7 | 66.5 |
|  | $Al_2O_3$ | 7.0 | 7.0 | 7.0 | 6.5 | 6.5 |
|  | $P_2O_5$ | 2.0 | 2.0 | 2.0 | 2.0 | 2.5 |
|  | $Li_2O$ | 9.9 | 9.9 | 9.9 | 8.5 | 7.5 |
|  | $K_2O$ | 2.0 | 2.0 | 2.0 | 1.5 | 1.5 |

TABLE 4-continued

| | | Examples | | | | |
|---|---|---|---|---|---|---|
| | | 16 | 17 | 18 | 19 | 20 |
| | MgO | 0.8 | 0.8 | 0.8 | 0.8 | 0.8 |
| | CaO | 0.0 | 0.0 | 0.0 | 0.0 | 0 |
| | BaO | 0.0 | 0.0 | 0.0 | 5.5 | 10.0 |
| | ZnO | 0.5 | 0.5 | 0.5 | 0.5 | 0.5 |
| | $ZrO_2$ | 2.3 | 2.3 | 2.3 | 4.0 | 4.0 |
| | $CeO_2$ | 0.0 | 0.0 | 0.1 | 0.1 | 0.1 |
| | $SnO_2$ | 0.5 | 0.5 | 0.1 | 0.1 | 0.1 |
| | others | $Bi_2O_3$ 0.5 | $MnO_2$ 0.2 | 0.0 | 0.0 | 0.0 |
| | total | 100.0 | 100.0 | 100.0 | 100.0 | 100.0 |
| | sulfate (converted to $SO_3$) | 0.0 | 0.0 | 0.17 | 0.17 | 0.17 |
| | chloride (converted to $Cl_2$) | 0.19 | 0.19 | 0.0 | 0.0 | 0.10 |
| | fluoride (converted to $F_2$) | 0.0 | 0.0 | 0.0 | 0.15 | 0.0 |
| bubbles per 1 $cm^3$ | | 8 | 7 | 8 | 5 | 3 |
| gl. ce. | s. gravity | 2.45 | 2.44 | 2.47 | 2.57 | 2.65 |
| | Y.m. (GPa) | 102 | 102 | 99 | 100 | 96 |
| | Y.m./s.g. | 41.6 | 41.8 | 40.1 | 38.9 | 36.2 |
| | α (25-100° C.) ($10^{-7}$ °$C.^{-1}$) | 71 | 70 | 76 | 64 | 62 |
| predominant crystal phase | | li. di.α-q. | li. di.α-q. | li. di.α-q. | li. di.α-q. β-q.s.s. | li. di.α-q. β-q.s.s. |
| hi. temp. (° C.) | | 720 | 720 | 730 | 690 | 690 |
| grain diameter(nm) | | 30 | 20 | 50 | 30 | 30 |

TABLE 5

| | | Examples | | | | |
|---|---|---|---|---|---|---|
| | | 21 | 22 | 23 | 24 | 25 |
| composition | $SiO_2$ | 66.5 | 66.5 | 66.7 | 66.1 | 75.45 |
| | $Al_2O_3$ | 6.5 | 6.5 | 6.5 | 6.5 | 7.0 |
| | $P_2O_5$ | 2.5 | 2.5 | 2.5 | 2.5 | 2.0 |
| | $Li_2O$ | 7.5 | 7.5 | 7.5 | 7.5 | 9.9 |
| | $K_2O$ | 1.5 | 1.5 | 1.5 | 1.5 | 2.0 |
| | MgO | 0.0 | 0.5 | 0.8 | 0.5 | 0.8 |
| | CaO | 0.8 | 0.3 | 0.0 | 0.3 | 0.0 |
| | SrO | 0.0 | 5.0 | 10.0 | 5.0 | 0.0 |
| | BaO | 10.0 | 5.0 | 0.0 | 5.0 | 0.5 |
| | ZnO | 0.5 | 0.5 | 0.5 | 0.5 | 0.0 |
| | $ZrO_2$ | 4.0 | 4.0 | 4.0 | 4.0 | 2.3 |
| | $CeO_2$ | 0.1 | 0.1 | 0.0 | 0.0 | 0.0 |
| | $SnO_2$ | 0.1 | 0.1 | 0.0 | 0.1 | 0.0 |
| | others | 0.0 | 0.0 | 0.0 | $Bi_2O_3$ 0.5 | $Sb_2O_3$ 0.05 |
| | total | 100.0 | 100.0 | 100.0 | 100.0 | 100.0 |
| | sulfate (converted to $SO_3$) | 0.0 | 0.0 | 0.17 | 0.17 | 0.17 |
| | chloride (converted to $Cl_2$) | 0.0 | 0.0 | 0.37 | 0.10 | 0.10 |
| | fluoride (converted to $F_2$) | 0.0 | 0.0 | 0.0 | 0.0 | 0.0 |
| bubbles per 1 $cm^3$ | | 6 | 8 | 3 | 7 | 2 |
| gl. ce. | s. gravity | 2.64 | 2.64 | 2.65 | 2.64 | 2.46 |
| | Y.m. (GPa) | 96 | 97 | 96 | 93 | 98 |
| | Y.m./s.g. | 36.4 | 36.7 | 36.2 | 35.2 | 39.8 |
| | α (25-100° C.) ($10^{-7}$ °$C.^{-1}$) | 65 | 62 | 62 | 65 | 77 |
| predominant crystal phase | | li. di.α-q. β-q.s.s. | li. di.α-q. β-q.s.s. | li. di.α-q. β-q.s.s. | li. di.α-q. β-q.s.s. | li. di.α-q. |
| hi. temp(° C.) | | 690 | 690 | 690 | 680 | 690 |
| grain diameter(nm) | | 30 | 30 | 30 | 20 | 50 |

TABLE 6

| | | Examples | | | | |
|---|---|---|---|---|---|---|
| | | 26 | 27 | 28 | 29 | 30 |
| composition | SiO2 | 66.65 | 66.3 | 75.1 | 66.5 | 66.5 |
| | Al2O3 | 6.5 | 6.5 | 7.0 | 6.5 | 6.5 |
| | P2O5 | 2.5 | 2.5 | 2.0 | 2.5 | 2.5 |
| | Li2O | 7.5 | 7.5 | 9.9 | 7.5 | 7.5 |
| | K2O | 1.5 | 1.5 | 2.0 | 0.5 | 0.5 |
| | Na2O | 0.0 | 0.0 | 0.0 | 1.0 | 1.0 |
| | MgO | 0.8 | 0.5 | 0.8 | 0.8 | 0.8 |
| | CaO | 0.0 | 0.3 | 0.0 | 0.0 | 0.0 |
| | SrO | 0.0 | 5.0 | 0.0 | 0.0 | 0.0 |
| | BaO | 10.0 | 5.0 | 0.0 | 10.0 | 10.0 |
| | ZnO | 0.5 | 0.5 | 0.5 | 0.5 | 0.5 |
| | ZrO2 | 4.0 | 4.0 | 2.3 | 4.0 | 4.0 |
| | CeO2 | 0.0 | 0.0 | 0.0 | 0.0 | 0.0 |
| | SnO2 | 0.0 | 0.2 | 0.2 | 0.0 | 0.0 |
| | others | $Sb_2O_3$ 0.05 | $Bi_2O_3$ 0.2 | $WO_3$ 0.2 | $Ta_2O_5$ 0.2 | $Nb_2O_5$ 0.2 |
| | total | 100.0 | 100.0 | 100.0 | 100.0 | 100.0 |
| | sulfate (converted to $SO_3$) | 0.17 | 0.0 | 0.0 | 0.17 | 0.17 |
| | chloride (converted to $Cl_2$) | 0.10 | 0.20 | 0.20 | 0.10 | 0.10 |
| | fluoride (converted to $F_2$) | 0.0 | 0.0 | 0.0 | 0.0 | 0.0 |
| bubbles per 1 $cm^3$ | | 2 | 4 | 15 | 8 | 12 |
| gl. ce. | s. gravity | 2.65 | 2.64 | 2.45 | 2.65 | 2.65 |
| | Y.m. (GPa) | 96 | 95 | 100 | 96 | 96 |
| | Y.m./s.g. | 36.2 | 36.0 | 40.8 | 36.2 | 36.2 |
| | α (25-100° C.) ($10^{-7}$ °$C.^{-1}$) | 62 | 64 | 75 | 63 | 63 |
| predominant crystal phase | | li. di.α-q. β-q.s.s. | li. di.α-q. β-q.s.s. | li. di.α-q. | li. di.α-q. β-q.s.s. | li. di.α-q. β-q.s.s. |
| hi. temp(° C.) | | 690 | 690 | 720 | 680 | 680 |
| grain diameter(nm) | | 30 | 30 | 40 | 30 | 30 |

TABLE 7

| | | Examples | | | |
|---|---|---|---|---|---|
| | | 31 | 32 | 33 | 34 |
| composition | SiO2 | 75.0 | 66.2 | 66.2 | 70.2 |
| | Al2O3 | 7.0 | 6.5 | 6.5 | 6.5 |
| | B2O3 | 0.0 | 0.0 | 0.0 | 0.0 |
| | P2O5 | 2.0 | 2.5 | 2.5 | 2.0 |
| | Li2O | 9.9 | 7.5 | 7.5 | 8.5 |
| | Na2O | 0.0 | 0.0 | 0.0 | 0.0 |
| | K2O | 2.0 | 1.5 | 1.5 | 1.5 |
| | MgO | 0.8 | 0.8 | 0.8 | 0.8 |
| | CaO | 0.0 | 0.0 | 0.0 | 0.0 |
| | SrO | 0.0 | 0.0 | 0.0 | 0.0 |
| | BaO | 0.0 | 10.0 | 10.0 | 5.5 |
| | ZnO | 0.5 | 0.5 | 0.5 | 0.5 |
| | ZrO2 | 2.3 | 4.0 | 4.0 | 4.0 |
| | CeO2 | 0.5 | 0.5 | 0.5 | 0.5 |
| | SnO2 | 0.0 | 0.0 | 0.0 | 0.0 |
| | total | 100.0 | 100.0 | 100.0 | 100.0 |
| bubbles per 1 $cm^3$ | | 2 | 0 | 0 | 0 |
| gl. ce. | s. gravity | 2.47 | 2.62 | 2.65 | 2.59 |
| | Y.m. (GPa) | 103 | 91 | 94 | 98 |
| | Y.m./s.g. | 41.7 | 34.9 | 35.5 | 37.9 |
| | α (25-100° C.) ($10^{-7}$ °$C.^{-1}$) | 85 | 62 | 65 | 60 |
| predominant crystal phase | | li di.α-q. | li. di.α-q. | li. di.α-q. | li. di.α-q. |
| hi. temp(° C.) | | 730 | 675 | 700 | 700 |
| grain diameter(nm) | | 90 | 20 | 30 | 30 |

For manufacturing the glass of the above Examples, raw materials including oxides, carbonates and nitrates etc. were mixed and, in the case of Example Nos. 11-20 and 23-30, sulfates, chlorides and fluorides were added to the raw materials, and these raw materials were melted in a commonly used melting apparatus at a temperature within a range from about 1400° C. to 1500° C. and stirred and homogenized. Then, the molten glass was formed to a shape of a disk and annealed to provide a glass form. Then, the glass form was heat treated at a temperature within a range from 500° C. to 650° C. for about 1 to 12 hours for nucleation and then the glass form was heat treated at a temperature within a range from 600° C. to 850° C. which was higher than the nucleating temperature for about 1 to 12 hours for crystallization to provide desired glass-ceramics. Thereafter, the glass-ceramics were lapped with a grain having an average particle diameter of 5-30 μm for about 10 to 60 minutes and then, after processing inner and outer diameters, were polished with cerium oxide having an average particle diameter of 0.5-2 μm for about 30 to 60 minutes to provide a substrate of an information storage medium. Surface roughness Ra (arithmetic mean roughness) of the substrate at this time was 2 Å or below. The surface roughness Ra was measured with an atomic force microscope (AFM).

As shown in Tables 1-7, the examples of the glass-ceramics of the present invention all have fine crystal grains of an average crystal grain diameter of 90 nm or below, mostly 50 nm or below. The examples have a coefficient of linear expansion within a temperature range from 25° C. to 100° C. which ranges from 60 to 85($10^{-7}$ °$C.^{-1}$), The number of remaining bubbles per 1 $cm^3$ of the glass is 1-16 exhibiting that the glass-ceramics have a refining effect which is equal to glass-ceramics in which a large amount of antimony or arsenic component is added. In Example Nos. 31-34, occurrence of reboiling during pressing is not observed when the direct press method is employed.

Comparative Example

Glass-ceramics were produced with the same composition and under the same conditions as in Example 1 excepting that the refining agent was not used and that the amount of $SiO_2$ was 75.5% in mass % on oxide basis. The number of remaining bubbles per 1 $cm^3$ of the glass was observed. The number of remaining bubbles was 70.

Example No. 35

A 2.5 inch HDD polished substrate (having a diameter of 65 mm and thickness of 0.635 mm) made of the glass-ceramics of Example 1 was immersed in a mixed salt of potassium nitrate and sodium nitrate ($KNO_3:NaNO_3=1:3$) at 400° C. for 0.5 hour to form a compression stress layer on its surface. It was confirmed that this substrate had ring flexural strength which was triple as large as the substrate before forming of the compression stress layer (500 MPa).

Example No. 36

A 2.5 inch HDD polished substrate (having a diameter of 65 mm and thickness of 0.635 mm) made of the glass-ceramics of Example 10 was immersed in a mixed salt of potassium nitrate and sodium nitrate ($KNO_3:NaNO_3=1:3$) at 400° C. for 0.5 hour to form a compression stress layer on its surface. It was confirmed that this substrate had ring flexural strength which was five-fold as large as the substrate before forming of the compression stress layer (500 MPa).

Example No. 37

A 2.5 inch HDD polished substrate (having a diameter of 65 mm and thickness of 0.635 mm) made of the glass-ceramics of Example 1 was heated to 300° C.-600° C. and then was quenched by air cooling to form a compression stress layer on its surface. It was confirmed that this substrate had improved ring flexural strength.

Example No. 38

A 2.5 inch HDD polished substrate (having a diameter of 65 mm and thickness of 0.635 mm) made of the glass-ceramics of Example 32 was immersed in a mixed salt of potassium nitrate and sodium nitrate ($KNO_3:NaNO_3=3:1$) at 400° C. for 0.5 hour to form a compression stress layer on its surface. It was confirmed that this substrate had ring flexural strength which was eight-fold as large as the substrate before forming of the compression stress layer (500 MPa). It was also confirmed that this substrate after it was immersed in the mixed salt for 0.16 hour had ring flexural strength which was triple as large as the substrate before forming of the compression stress layer and that the substrate after it was immersed in the mixed salt for 0.32 hour had ring flexural strength which was five-fold as large as the substrate before forming of the compression stress layer.

Example 39

A chromium alloy base layer and a cobalt alloy magnetic layer were formed by DC spattering on the substrate obtained by the above described examples and further a diamond-like-carbon layer was formed thereon. A perfluoropolyether type lubricant was finally coated to provide an information magnetic storage medium.

Example 40

The glass before crystallization of Example No. 32 was heat treated at 600° C. for 6 hours and subjected to a processing to have a diameter of 65 mm and thickness of 0.635 mm to provide a substrate in the form of a disk having an inner central opening. By observation with a TEM, phase separation in the substrate was confirmed. The surface of the substrate was lapped for about 10-60 minutes with a grain having an average particle diameter of 0.5 μm-2 μm and, after processing inner and outer diameters, was polished with cerium oxide having an average particle diameter of 0.51μ-2 μm for about 30 to 60 minutes. The surface roughness Ra after polishing was an excellent one of 0.45 Å.

The substrate thus obtained was immersed in a mixed salt of potassium nitrate and sodium nitrate ($KNO_3:NaNO_3=3:1$) at 400° C. for 0.5 hour to form a compression stress layer on its surface. It was confirmed that this substrate had ring flexural strength of 2000 MPa which was somewhat inferior to a case where a substrate was made of the glass-ceramics of the same example but nevertheless had sufficient strength as a substrate of an information storage medium.

Example 41

The glass before crystallization of Example No. 32 was heat treated at 490° C. for 2 hours and subjected to a processing to have a diameter of 65 mm and thickness of 0.635 mm to provide a substrate in the form of a disk having an inner central opening. The surface of the substrate was lapped for about 10-60 minutes with a grain having an average particle diameter of 0.5 μm-2 μm and, after processing inner and outer diameters, was polished with cerium oxide having an average particle diameter of 0.5-2 μm for about 30 to 60 minutes. The surface roughness Ra after polishing was an excellent one of 0.48 Å.

The substrate thus obtained was immersed in a mixed salt of potassium nitrate and sodium nitrate ($KNO_3:NaNO_3=3:1$) at 400° C. for 0.5 hour to form a compression stress layer on its surface. It was confirmed that this substrate had ring flexural strength of 1800 MPa which was somewhat inferior to a case where a substrate was made of the glass-ceramics of the same example but nevertheless had sufficient strength as a substrate of an information storage medium.

INDUSTRIAL APPLICABILITY

According to the invention, in glass-ceramics used for a substrate of a magnetic recording medium for various information storage devices, particularly glass-ceramics used for a perpendicular magnetic recording medium, a medium for patterned media devices and a medium for a discrete track, an excellent refining effect which is equal to the prior art glass-ceramics can be achieved without using a harmful arsenic or antimony component which has been conventionally used as a refining agent or restricting use of the antimony component to an amount of less than 0.1%.

According to the invention, glass-ceramics can also be provided which have a low viscosity characteristic which can cope with press forming for a large scale production, a very flat substrate surface which can cope with the tendency to the low flying height of the magnetic head, a high Young's modulus and low specific gravity which can cope with high speed rotation, and excellent mechanical strength. For these reasons, the glass-ceramics are useful for a substrate of an information storage medium, particularly a substrate of a perpendicular magnetic recording medium for a HDD.

Further, since the glass-ceramics of the present invention are substantially free of arsenic and antimony components as a refining agent or comprise an antimony component in a very small amount of less than 0.1%, corrosion of a molybdenum electrode which is generally used for electric melting by direct supply of electric current can be significantly reduced.

What is claimed is:

1. Glass-ceramics comprising, on oxide basis:

| | |
|---|---|
| $SiO_2$ | 64-78%, |
| $Li_2O$ | 5-12%, |
| $Al_2O_3$ | 4-10%, |
| $P_2O_5$ | 1.5-3.0% and |
| $ZrO_2$ | 1-10%, | wherein the glass-ceramic further comprises one or more elements selected from the group consisting of Sn, Ce, Mn, W, Ta, Bi, Nb, S, Cl and F,
the glass-ceramic is free of $As_2O_3$ and $Sb_2O_3$, and
the glass ceramic includes lithium disilicate as a crystal phase.

2. Glass-ceramics as defined in claim 1 further comprising at least one crystal phase selected from the group consisting of lithium monosilicate, α-quartz, α-quartz solid solution and β-quartz solid solution.

3. Glass-ceramics as defined in claim 1 comprising at least one element of Sn and Ce and comprising in mass % on oxide basis

| | |
|---|---|
| $SnO_2$ | 0-2.5% and |
| $CeO_2$ | 0-2.5% | where a total amount of $SnO_2$ and $CeO_2$ is within a range from 0.01% to 5.0%.

4. Glass-ceramics as defined in claim 1 comprising one or more elements selected from the group consisting of S, Cl and F by using at least one of sulfate, chloride and fluoride as a raw material wherein an amount of each of the sulfate, chloride and fluoride to a total mass on oxide basis of glass materials other than the sulfate, the chloride and the fluoride is:

| | |
|---|---|
| sulfate calculated as an amount converted to $SO_3$ | 0-1.5 mass % |
| chloride calculated as an amount converted to $Cl_2$ | 0-1.5 mass % |
| fluoride calculated as an amount converted to $F_2$ | 0-1.5 mass % | where $SO_3+Cl_2+F_2$ is 0.01-1.5 mass %.

5. Glass-ceramics as defined in claim 1 comprising one or more elements selected from the group consisting of Mn, W, Ta, Bi and Nb, a total amount in mass % on oxide basis of one or more of $MnO_2$, $WO_3$, $Ta_2O_5$, $Bi_2O_3$ and $Nb_2O_5$ being within a range from 0.01% to 2.5%.

6. Glass-ceramics as defined in claim 1, further comprising, in mass % on oxide basis, one or more selected from

| | |
|---|---|
| BaO | 0-15%, |
| SrO | 0-15%, |
| MgO | 0-2%, |
| CaO | 0-2%, |
| ZnO | 0-3%, |
| $K_2O$ | 0-3%, |
| $Na_2O$ | 0-3%, |
| $Cs_2O$ | 0-3%, and | one or more oxides selected from the group consisting of $Gd_2O_3$, $La_2O_3$, $Y_2O_3$ and $Ga_2O_3$ in a total amount of 0-15%.

7. Glass-ceramics as defined in claim 1 further comprising one or more oxides selected from the group of

| | |
|---|---|
| $Na_2O$ | 0-3%, |
| $K_2O$ | 0-3%, and |
| $Cs_2O$ | 0-3%, | wherein a total amount of $Li_2O$, $Na_2O$, $K_2O$ and $Cs_2O$ is from 5% to 14%.

8. Glass-ceramics as defined in claim 1 wherein average coefficient of linear expansion within a temperature range from 25° C. to 100° C. is within a range from 50 ($10^{-7}$ °$C.^{-1}$) to 120 ($10^{-7}$ °$C.^{-1}$).

9. Glass-ceramics as defined in claim 1 wherein average crystal grain diameter of the crystal phase is 100 nm or below.

10. A substrate of an information storage medium using glass-ceramics as defined in claim 1.

11. A substrate of an information storage medium as defined in claim 10 having Young's modulus of 85 GPa or over.

12. A substrate of an information storage medium comprising a compression stress layer provided on the surface of a substrate as defined in claim 10.

* * * * *